Jan. 16, 1968  B. F. RAYNES  3,363,372
MULTI-SPAR PANEL STRUCTURES
Filed Dec. 28, 1964  4 Sheets-Sheet 1
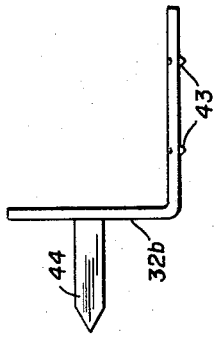
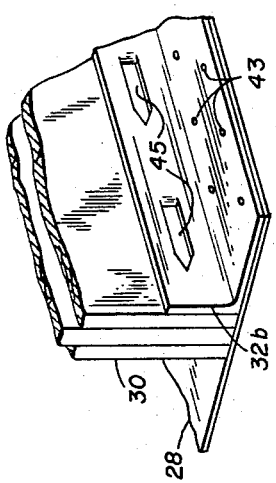
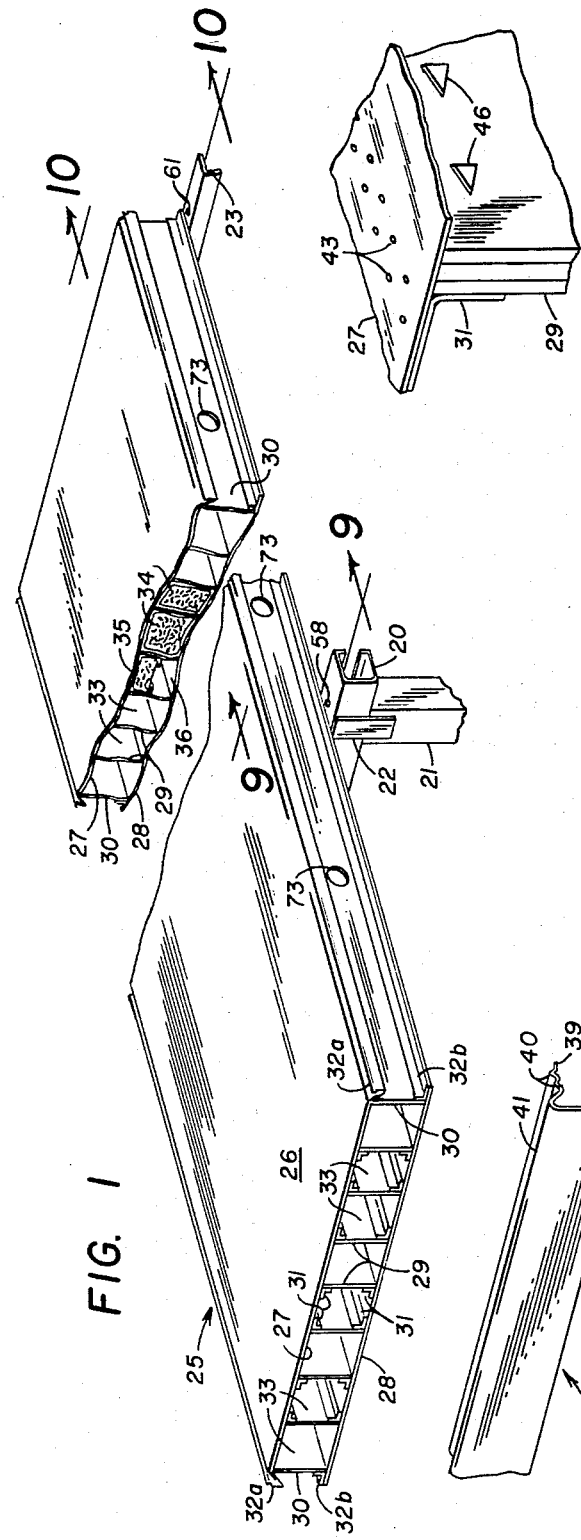
INVENTOR.
B. F. RAYNES
BY
George E. Pearson
ATTORNEY Jan. 16, 1968 B. F. RAYNES 3,363,372
MULTI-SPAR PANEL STRUCTURES
Filed Dec. 28, 1964 4 Sheets-Sheet 2
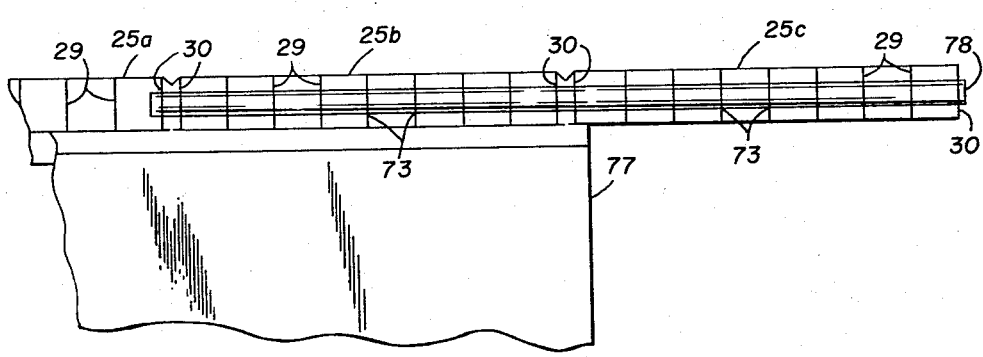
FIG. 12
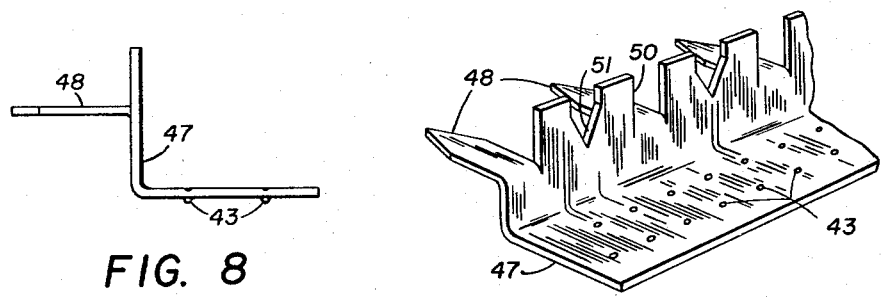
FIG. 8
FIG. 7
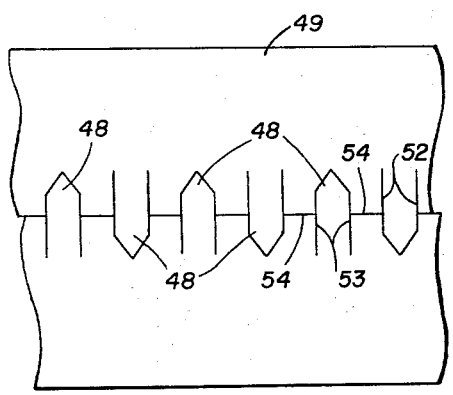
FIG. 6
INVENTOR.
B. F. RAYNES
BY George E. Pearson
ATTORNEY INVENTOR.
B. F. RAYNES
BY George E. Pearson
ATTORNEY INVENTOR.
B. F. RAYNES
BY George E. Pearson
ATTORNEY

United States Patent Office 3,363,372
Patented Jan. 16, 1968

3,363,372
MULTI-SPAR PANEL STRUCTURES
Burt F. Raynes, Chula Vista, Calif., assignor to Rohr Corporation, Chula Vista, Calif., a corporation of California
Filed Dec. 28, 1964, Ser. No. 421,167
5 Claims. (Cl. 52—93)

ABSTRACT OF THE DISCLOSURE

Elongated modular type panels providing optimum stress levels, span lengths, and panel loading are disclosed. A plurality of spaced thin webs disposed on edge between spaced facing sheets of each panel extend longitudinally thereof in parallel relation over the length of the panel. Angular members which also extend the length of the panel and serve as stiffeners, respectively connect opposite edge portions of each web to the facing sheets. The angle members are metallic and have cleats for fastening the same to the webs which are non-metallic. The angle members may be welded, bolted, or otherwise suitably fastened, to the facing sheets which may be metallic or non-metallic. Adjoining panels utilize adjacently disposed edge portions of their facing sheets to couple the panels together. Inter panel shear fittings in the form of tabbed tubes engage the adjacently disposed webs of adjoining panels to provide shear strength for the composite panel wall.

State of the prior art

This invention relates generally to stressed skin sandwich panel type building structures and more particularly to a building panel of this type having a multi-spar construction. Still more specifically, the present invention is directed to modular type panel structures of this type which may be manufactured with precision at the factory and assembled on-site from module to module to build up wall, floor, ceiling, or roof sections of homes or commercial buildings, as the case may be.

Various modular stressed skin sandwich type panel structures have heretofore been devised for the purpose such, for example, as the foam-cored sandwich type wall and roof panels disclosed and claimed in my copending application Ser. No. 212,393, filed July 25, 1962 for Building Construction, now Patent No. 3,203,145.

Although the foam cored panels are ideally suited in many respects for use as building structures, the same are not entirely satisfactory under certain conditions of use as where, for example, the insulation afforded by the foamed core is not required in the eaves, gables, and patio portions of a home building structure, and where the core prevents ready access to panel fasteners, blocks passage of utility lines, or fills spaces which otherwise would afford natural channels for the flow of air for heating and air conditioning.

In accordance with the structural principles of the present invention, the limitations of foam-cored and other prior art panels are largely obviated in the panel structures presently to be described by the use of multi-spar construction disposed at spaced intervals over the width of the panel and comprising spaced thin webs which extend longitudinally of the spaced facing sheets of the panel and are disposed on edge therebetween and secured thereto by connecting members which are formed angular in cross section to serve as stiffeners as well as to afford surfaces for attachment of the webs to the facing sheets. Materials for the facing sheets, webs and connecting members may variously be employed, and the means to fasten these parts together may likewise be varied. Thus, for example, as in a specific mode of construction, the webs are non-metallic (plywood) and the connecting members are elongated metallic angle members having integrally formed cleats spaced along the length thereof for piercing and clinching engagement with the plywood webs, and also having integrally formed and spaced projections for projection welding to the metallic facing sheets. In another mode of construction as where a plywood facing sheet is employed in a floor panel, the angular sheet metal connecting members are stapled to both the associated plywood facing sheet and to the web. Still in another fire resistant mode of construction the webs may be made of asbestos cement board and stapled to the metallic connecting members as before.

The elongated channels enclosed by the spaced webs and facing sheets may be entirely filled with insulation materials, loosely or in bats, or foamed in situ as with polyurethane foam, or only partially filled to leave voids for access to fasteners, or to provide passages for utility lines such as water, waste, and sprinklers, or to accommodate air ducts for heating and ventilation.

The web width and thickness dimensions and the cross sectional dimensions and configuration of the connecting members, moreover, may be varied as necessary to meet span and loading requirements and to provide suitable coupling arrangements between the panels as the same are assembled on module on site.

The present invention thus features a modular panel construction which virtually may be unlimited as to length, which lends itself to continuous mass production, which may receive insulation in whole or in part as required to afford adequate insulation, heating, air conditioning, and utility installations, which may be constructed wholly incombustible and in which materials and dimensions of all structural elements may be varied at will and in accordance with economic considerations to provide optimum stress levels, span lengths, and panel loading.

Summary of the invention

In summary, the present invention discloses a multi-spar unitary modular type panel construction providing for interconnection from panel to panel and including a plurality of thin web members which are disposed in mutually parallel spaced relation and on edge between the spaced facing sheets of each panel. Angle section stiffener members coextensive with the web members are employed to secure the respective edge portions of each web to its facing sheets.

Objects

It is an object of the present invention therefore to provide improvements in factory fabricated, modular type panel structures adaptable for mass production methods and ideally suited for use in homes and commercial buildings.

Another object is to provide panel structures of this type which may be constructed incombustible, as required, and in which the structural elements, their materials and dimensions, may be varied to meet various panel span and loading requirements, as well as to render the panel structures suitable for use in various applications such as for floor, wall, or roof panels.

Another object resides in the provision of modular type panel structures having provision for accommodating insulation materials, utility lines, heating and air conditioning passages, and panel tie-down means.

Still another object is to provide stressed sandwich panel building modules which embody the high strength and low weight characteristics of multi-spar construction.

Still a further object in a stressed sandwich panel construction is the provision of novel coupling arrangements between adjacent panels to effect a continuous shear plane over the roof area.

Still other objects, features and advantages of the present invention will become more fully apparent as the description proceeds, reference being had to the accompanying drawings wherein:

*Brief description of the drawings*

FIG. 1 is a view, partially cut away, and showing in perspective, a roof panel constructed in accordance with the principles of the present invention;

FIG. 2 is a view in perspective of a fascia suitable for use with the roof panel of FIG. 1;

FIG. 3 is a fragmentary view of the panel of FIG. 1, as viewed from the left thereof, and showing the attachment of an upper intermediate connecting member to its associated web and facing sheet;

FIG. 4 is a fragmentary view of the panel of FIG. 1, as viewed from the left, and showing the attachment of the lower, outer right connecting member to its associated outer right web and lower facing sheet;

FIG. 5 is an end view of an intermediate connecting member;

FIG. 6 is a layout view illustrating a process of manufacture of an alternative form of intermediate connecting member;

FIG. 7 is a view in perspective of an alternative form of intermediate member formed from the blank of FIG. 6;

FIG. 8 is an end view of the connecting member shown in FIG. 7;

FIG. 12 is a diagrammatic view illustrating a manner of supporting an overhanging panel;

*Specification*

Figure 11:
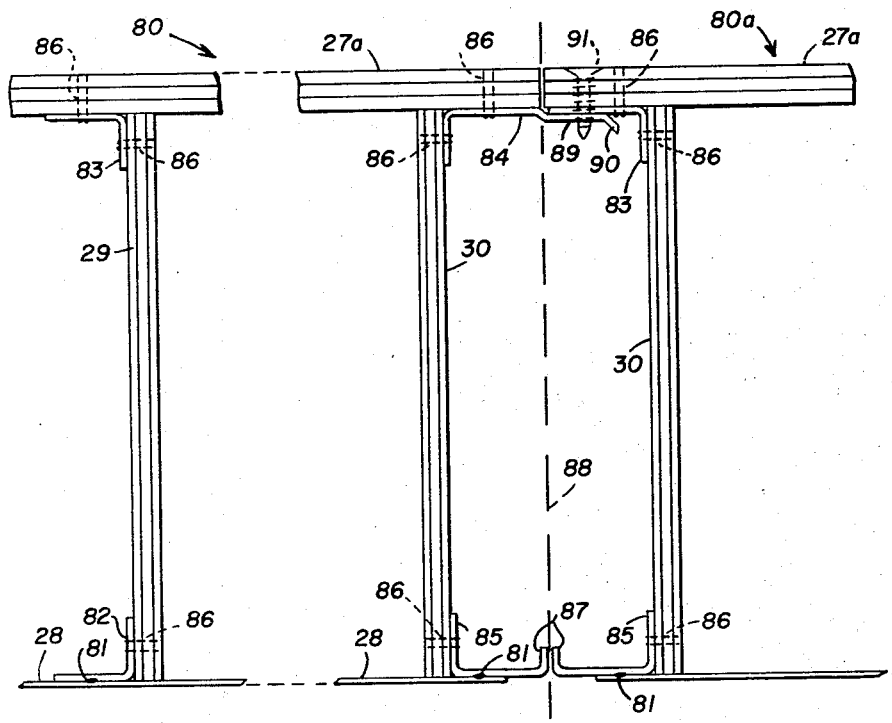
FIG. 11 is a somewhat enlarged fragmentary end view of adjacently disposed floor panels.

Referring now to the drawings, and first more particularly to FIG. 1 thereof, 20 designates a wireway which also serves as an outer wall beam and 21 designates a tubular stud which is secured to the wireway by the strap 22 which is welded to the stud and fastened, as by a bolt (not shown) to the wireway. The wireway and stud comprise portions of a load bearing steel framework for an outer panelled wall such as disclosed in my aforesaid copending application Ser. No. 212,393. Similarly 23 designates a portion of a ridge beam such as may be similar or equivalent to that disclosed in my copending application aforesaid.

An elongated modular type of stressed skin sandwich roof panel is generally designated 25 and, as shown, is supported upon, and positioned to span the distance between the ridge beam 23 and the wireway 20 while also providing an eaves overhanging panel end portion 26 of the order of 4 feet in the proportions shown, the span itself being upwards of the order of 20 feet.

Figure 13:
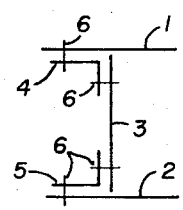
FIG. 13 is a diagrammatic view of the spar construction employed in the panels of the present invention.

Panel 25 in its construction utilizes to advantage the proven high strength-low weight characteristics of spar structures such as depicted schematically in FIG. 13 wherein a composite structure of generally I beam configuration is disclosed and comprises skin members 1 and 2, web 3, and connecting members 4 and 5 all joined together by suitable fasteners which are depicted schematically by the lines 6. This basic spar construction is repeated at spaced intervals over the modular width of panel 25 to thus provide a high strength, low weight panel structure, appropriately referred to as a multi-spar panel.

Referring again to FIG. 1, the panel comprises upper and lower spaced facing sheets 27 and 28 which may be formed of any materials suitable for the purpose, upper sheet 27, for example, being formed of 24 gage galvanized sheet steel and lower sheet 28, for example, being formed of 26 gage bare sheet steel. Disposed on edge between the facing sheets and extended the length thereof are a plurality of thin intermediate webs 29 and outer webs 30 which may be formed of any material suitable for the purpose such, for example, as a commercial grade of plywood (3 ply). The webs preferably are non-metallic in order to avoid transfer of heat between the panels by way of conduction through the webs. When an incombustible panel structure is required, the webs may be formed, for example, of thin strips of cement asbestos board.

Panel 25 is a 4 foot module and, there being 9 webs as shown, the spacing between webs is of the order of 6 inches. The upper skin may thus be very thin as aforementioned and yet provide adequate support as against the loading imposed, for example, by a man walking on the roof.

The webs 29 and 30 are secured to facing sheets 27 and 28 by means of intermediate and outer connecting members 31 and 32 respectively, which being of angular configuration also serve as stiffeners for the facing sheets. For reasons hereinafter to appear, the upper outer connecting members are designated 32a and the lower outer connecting members are designated 32b. The connecting members may be formed of any material suitable for the purpose such, for example, as 24 gage galvanized steel for the upper members and 26 gage bare steel for the lower connecting members. It will be appreciated that the connecting members 31 and 32 could be formed of various materials such, for example, as sheet metal, and as such, could be formed integrally with the webs 29 and 30.

The webs and facing sheets enclose therebetween a plurality of channels or passageways 33 through which utility lines such as electric wiring, plumbing, etc., may be extended, or the passageways may serve as ducts for the flow of air for heating or air conditioning. In order to use the passageways for such purposes, even when the same must carry heat insulation materials as indicated by the insulation bats 34 and 35 formed of fiber glass or the like, the smaller cross section bats 35 are employed and secured adjacent to upper skin 27 by suitable fasteners or partitions (not shown) to thus leave a partial passageway 36 which is usually sufficient for the purpose.

Insulation such as the bats 34 and 35 may thus be used in the passageways 33 to wholly or partially fill the same, as required, or the insulation may be dispensed with entirely as in the eaves overhang panel region 26, or in other regions where insulation is not required as where the panels form a patio ceiling, or the like.

The open overhang end of the panel 26 is closed by a fascia 37 which is in the form of a channel member having a lower flange 38 providing a slip fit under the lower skin or facing sheet 28 and an upper flange 39 providing a slip fit over the upper skin or facing sheet 27. Channels 40 are provided in flange 39 to receive a suitable sealant such as caulking compound, and flange 39 is doubled back as at 41 from the base 42 of the channeled fascia 37 such that the doubled back portion 41 serves as a gravel guard. The fascia may similarly be positioned along the sides of the panel where the same serves as the gable overhang panel 25c disclosed in FIG. 12. Metal screws (not shown) may be employed to secure the fascia flanges 38 and 39 to their respective facing sheets 28 and 27.

Referring now more particularly to FIGS. 3 to 5 for a more detailed description of the connecting members, it will be seen that the members 31 and 32b are identical. The coupling members 32a, however, have additional structural configuration for a purpose more fully to be explained, it being sufficient at this point merely to direct attention to the right angular configuration of connecting members 31 and 32b (FIGS. 4 and 5) in contrast with the generally Z-shaped configuration of the coupling members 32a (see FIG. 9). In so far as the manner of attachment of the connecting members to their associated web and facing sheets is concerned, however, all of the connecting members are structurally identical, each having on one leg of the elongated connecting member, two spaced rows of dimpled projections 43, these being staggered from row to row as best seen in FIG. 4, and having formed in the other leg, integral cleats or staples 44 which are spaced at equal intervals over the length of the member. The projections 43 serve to projection weld each connecting member to its associated facing sheet, and the cleats 44 serve to secure each connecting member to its associated web, the cleats being pointed to facilitate piercing of the web material and being punched and bent right angularly outwardly from the material per se of the connecting member to thus leave correspondingly shaped openings 45 in the member. Each cleat, in addition, may be given a slight curvature (not shown) in cross section and extended along the longitudinal line through its point, thereby to stiffen the same.

The forming of the connecting members and the projections 43 and cleats 44 therein, the braking, progressive die forming, or otherwise forming of the connecting members into their angular configuration, the piercing of the webs 29, 39 by the cleats, followed by clinching of the cleats against the webs as depicted at 46 in FIG. 3, and the projection welding of the connecting members to the facing sheets may each be accomplished progressively whereby the panel fabrication is thus one which lends itself to a continuous assembly line process.

Reference is now made to FIGS. 6 to 8 wherein an alternative form of connecting member 47 and its manner of fabrication are disclosed. Connecting member 47 is generally similar to members 31 and 32b disclosed in FIGS. 3 to 5 and differs therefrom only in that the cleats 48 of member 47 are bent so as to lie in a longitudinal plane parallel with that of the leg having the projections 43 in contrast with the cleats 44 (FIG. 5) of member 32b which lie in cross sectional planes through the connecting member.

As an incidence of the manner of forming a pair of companion connecting members 47 from a common blank or sheet 49 (FIG. 6), the cleated leg of each member has a series of resultant notches 50 and 51 (FIG. 7) of which 50 designates the notches left after bending their associated cleats 48 outwardly of the leg and 51 designates the notches left by the cleats of the companion connecting member. The punch, or punches, as the case may be, used on the blank 49 are formed and shaped such that continuous cuts are made for the alternately spaced and oppositely disposed cleat patterns 52 and 53, and such that interconnecting cuts 54 are made between the cleat patterns to thus divide the blank into two separate parts.

Figure 9:
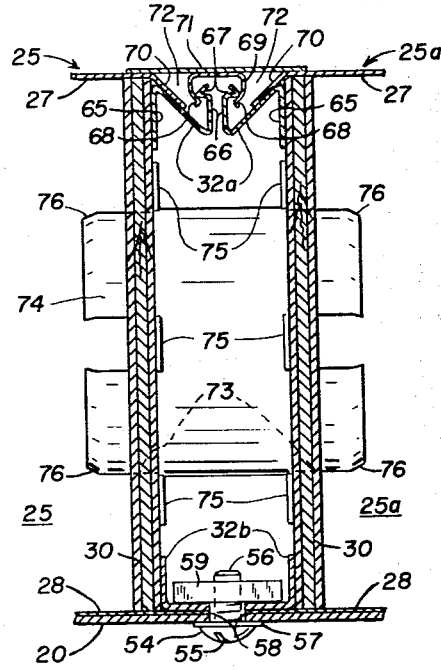
FIG. 9 is a view in section taken within the plane 9—9 of FIG. 1.
Figure 10:
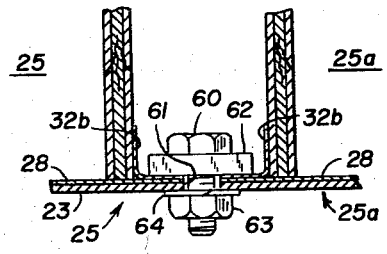
FIG. 10 is a view in section taken within the plane 10—10 of FIG. 1.

Referring now to FIGS. 1, 9 and 10, it will be seen that a pair of panels 25 and 25a disposed on module and positioned adjacent each other as in FIGS. 9 and 10 are tied down together to the wireway 20 and in similar manner to the ridge beam 23. Referring first to FIG. 9, a bolt 54 having a screw driver slot 55 or other driving means, and having a threaded shank 56, carries a washer 57, and after passing through a hole 58 provided therefor in the wireway wall beam 20, is screwed into a tapped block 59 formed of suitable material such as hard rolled steel. Block 59 is seated on adjacently disposed and confronting leg portions of the outer connecting members 32b with the result that the adjacently disposed panels 25 and 25a are clamped together and tied down to the wireway as the bolt 54 is tightened into the block.

Referring now to FIG. 10, a hex bolt 60 is similarly employed at the ridge beam 23 for tie down of the panels 25 and 25a thereto, the ridge beam similarly being provided with an opening 61 to receive the bolt. In this case the head of the bolt engages a block 62 formed of hot rolled steel and having an opening to pass the shank of the bolt. Block 62 is seated on the confronting leg portions of the outer connecting members 32b, as before, and a nut 63 for the bolt carries a washer 64 which engages the ridge beam 23 with the result that the panels 25 and 25a are clamped together and tied down to the ridge beam as the nut is tightened on the bolt.

Referring again to FIG. 9, it will be seen that the connecting members 32a have a Z-shaped configuration, as aforementioned. One leg 65 of each Z member is stapled to its associated web 30, in the manner heretofore described, such that the terminal leg portion 66 of each Z member extends upright and parallel to the anchored leg portion 65. Terminal leg portions 66 have terminal projections 67 which are oppositely formed and extended with respect to coacting projections 68 formed at the terminal cross sectional ends of a coupling channel member 69 which is generally U-shaped in cross section and formed of a suitable material such, for example, as 24 gage galvanized steel. The connecting members 32a and the coupling channel 69 have inherent resiliency such that their respective coacting terminal portions 67 and 68 yield sufficiently relative to each other as the coupling channel 69 is forced onto the connecting members and into the interlocking position shown. Upon reaching this ultimate position, the oppositely formed and coacting projections 67 and 68 move with a snap action to thus interlock the adjacent panels 25 and 25a together.

The terminal edge portions 70 of the upper facing sheet 27 are bent to conform to the configuration of the interconnecting portion of the Z connecting members, as shown, and are projection welded thereto in the manner heretofore described.

Coupling channel member 69 has secured thereto, as by welding, a plate 71 which bridges the facing sheet 27 of the adjacently disposed panels 25 and 25a in overlying or overlapping relation therewith. Bridging plate 71 may be formed of any material suitable for the purpose such, for example, as 24 gage galvanized steel. The cavities or channels 72 thus formed by the enclosing bridging plate 71, coupling channel 69, connecting members 32a and facing sheet portions 70 preferably are filled with a suitable sealant (not shown) such, for example, as caulking compound, thereby to seal the composite roof surface formed by the coupled panels.

Referring now with particular reference to FIGS. 1 and 9, it will be seen that openings 73 formed in the outer webs 30 and spaced at intervals such as 4 feet, for example, along the length thereof, serve to receive, substantially interfittingly therewith, short lengths of tubing 74 which may be formed of any material suitable for the purpose such for example, as flush welded 16 gage, 3 inch diameter, steel tubing. These tubes serve as inter-panel shear fittings to thus interlock the panels such that the same provide flush continuous facing surfaces and comprise a unitary stress wall. In order to retain the desired inter-panel positions of shear fittings 74, circumferentially spaced end portions of the same are cut out and bent back to form tabs 75 which bear against the confronting surfaces of the outer webs 30 of the adjacently disposed panels 25 and 25a. The remaining circumferentially spaced tube portions are bent inwardly as depicted at 76 to facilitate insertion of the fittings 74 into the openings 73 in the webs.

FIG. 12 discloses a suitable arrangement for supporting a gable overhang panel 25c in relation to adjacently disposed panels 25a and 25b, the gabled end wall of the associated building being depicted at 77. Elongated steel tubes 78 similar except for length to the inter-panel tubes 74 are extended through the openings 73 provided in the outer webs 30 of panels 25a, 25b, and 25c and also provided, for this purpose, additionally in the intermediate webs 29 of panels 25b and 25c. The tubes 28 are secured in position by any suitable means (not shown) such, for example, by integrally provided tabs secured as by screws to the outer connecting member 30 of gable overhang panel 25c.

Referring now to FIG. 11 which discloses an inter-panel flooring arrangement, it will be seen that the upper skins or facing sheets 27a of the adjacently disposed floor panels 80 and 80a are formed of a suitable non-metallic material such, for example, as plywood (3 plys). It will be noted that the plywood skins 27a are somewhat thicker than the webs 29 and 30 which are generally the same as heretofore described in connection with the roof panels. The plywood webs are of the order of 5/16 inch as compared to the plywood skins which are of the order of 3/8 inch. The lower skins 28 are formed of sheet steel as in the case of the roof panels and are projection welded as depicted at 81 to their associated lower connecting members 82 and 85 which have dimpled projections (not shown) as heretofore described. Intermediate connecting members 82 and 83 are generally similar except that connecting members 83 for the upper skins do not have welding projections and are secured instead as by staples 86, or as by self tapping screws, to their associated plywood webs and skins. Connecting members 85 are generally similar to connecting members 82 but additionally have mutually confronting turned up flanges 87 which serve to strengthen the adjacently disposed panels 80 and 80a along the module line as depicted by the dashed line 88.

Connecting member 84 of panel 80 is formed generally similar to connecting members 83 but additionally has an offset or joggled terminal portion 89 to receive in overlying relation therewith, the adjacently disposed and confronting portion of the connecting member 83 of panel 80a, and connecting member 84, moreover, is turned downwardly at its edge extremity as depicted at 90 to facilitate movement of the panels together. Suitable screws such as depicted at 91 are employed at spaced intervals along the length of the adjacently disposed panels to secure the same together.

In the shear-lock panel coupling arrangement disclosed in FIG. 14, the desired unitary stress wall effect provided by the shear-lock fitting tubes 74 of FIG. 9, is provided alternatively by the confronting connecting members 32a' and the inverted C-shaped clinch-cap 93 which is interlocked therewith in a manner subsequently to be described. A snap-cap 94, generally similar to the assembly of plate 71 and its depending coupling channel 69 of FIG. 9, is provided to bridge and close the gap between the upper surfaces of the adjacently disposed panels 25' and 25a'.

Connecting members 32a' are inverted double U-channels in cross section and are formed of any material suitable for the purpose such, for example, as 24 gage galvanized steel. One half of each double U-channel is secured to the skin and web of its respective panel. Thus, the leg 95 is stapled to the web 30, the bight portion 96 is projection welded to the facing sheet 27, and the edge portion 70 of the facing sheet is bent into near conformity with the center leg 97, all generally as described in connection with the disclosure of FIG. 9.

The other one half of each double U-channel 32a' includes the common leg 97 and further comprises a bight portion 98 and a leg 99. Leg 99 terminates in an inwardly rounded edge portion 100 which, in turn, terminates in an outwardly facing edge which confronts with and substantially meets the corresponding edge of the other connecting member 32a', as indicated at 101. The legs 99 and their rounded portions 100 of the adjacently disposed connecting members 32a' together form a composite construction which is generally bulb-shaped in cross section and is hereinafter referred to as the "bulb" for the sake of simplicity.

Figure 14:
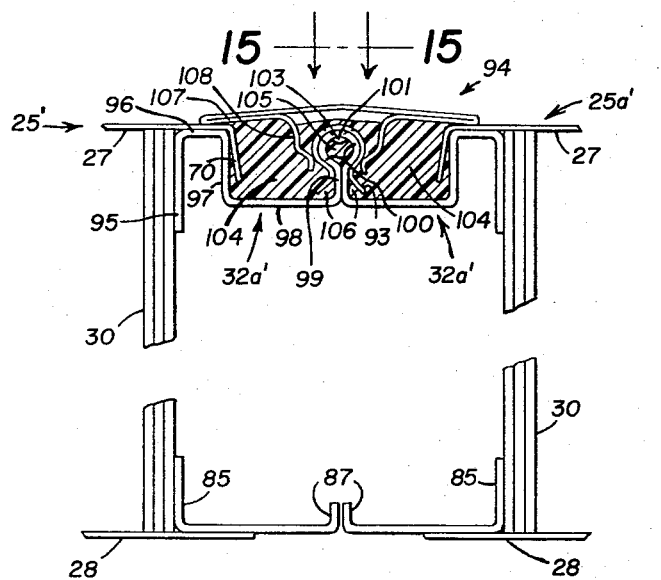
FIG. 14 is a cross sectional view similar to FIG. 9 and depicting an alternative form of shear lock panel construction.

Clinch-cap 93 extends coextensively with the connecting members 32a' and in its pre-formed condition preferably is in the form of a U-channel in cross section with the edge portions flared outwardly, this flared condition being retained as appears in FIG. 14 notwithstanding the forming operation, presently to be described, wherein the clinch cap which is also formed of 24 gage galvanized steel, is caused generally to conform to the shape of the aforedescribed composite bulb 100—100 of the confronting connecting members 32a'.

Figure 15:
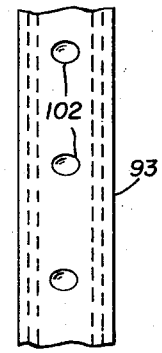
FIG. 15 is a plan view of a portion of the clinch cap as viewed along the line 15—15 of FIG. 14, the cover plate being removed.

In the clinching operation, the clinch-cap 93 is first filled with a suitable sealant such, for example, as caulking compound, and forced over the composite bulb 100—100. The clinch-cap is then clinched so as to conform to the shape of the composite bulb 100—100, as shown, this being accomplished progressively over the length of the clinch-cap while simultaneously staking the clinch-cap to the composite bulb at spaced intervals of the order of 1 inch, as best seen in FIG. 15 wherein are depicted the depressions 102 which result from the staking operation. A corresponding protrusion 103 formed in the composite bulb 100—100 may be seen in FIG. 14.

The aforedescribed clinching operation on clinch-cap 93 may be performed by any means suitable for the purpose, but preferably is accomplished by a special machine designed to walk along and within the channels 104 and progressively clinch and stake the clinch-cap to the composite bulb-shaped structure 100—100.

As a further result of the clinching operation, the sealant works into and substantially fills the chamber 105 formed by the bulb 100—100 as well as the chambers 106 enclosed between the flared edge portions of the clinch-cap and the bight and wall portions 98-99 of the connecting members 32a'. The channels 104 are further filled, however, to the order of about 90% of capacity with additional sealing compound, and the snap-cap 94 is then snapped onto the clinch-cap 93 to thus bring the doubled back portions 107 of the snap-cap into tightly sealed engagement with the skins 27, thereby to establish a continuous sealed surface as the sealing compound works its way between the overlapping and engaging surfaces.

Snap-cap 94 is formed from a single sheet of a material suitable for the purpose such, for example, as 26 gage galvanized steel, and is doubled back in the aforementioned regions 107 and flared outwardly in the edge portions regions 108 to provide for yieldable engagement with the clinch-cap 93 to thus effect the desired snap action therebetween.

Figure 16:
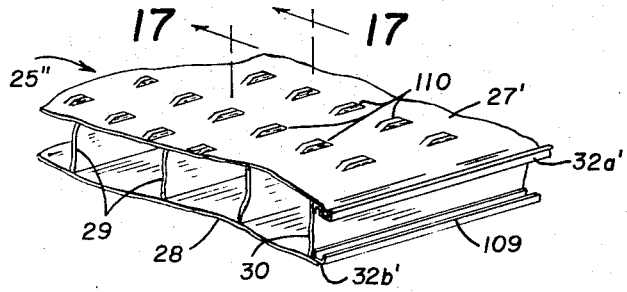
FIG. 16 is a fragmentary view, partially in section, depicting an alternative panel construction which features the use of bridge anchors.
Figure 17:
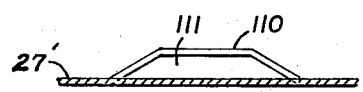
FIG. 17 is a sectional view taken along the line 17—17 of FIG. 16.

Referring now to FIGS. 16 and 17 a modified panel 25" is disclosed wherein the lower connecting member 32b' preferably is provided with an upturned flange 109 which is comparable to the flange 87 of connecting members 85 disclosed in FIGS. 9 and 14, this being the preferred construction for use on all of the panels herein disclosed.

The skin 27' of panel 25" is specially constructed in accordance with a feature of the invention wherein the skin is provided a plurality of bridge anchors 110, so-called because of their "bridge-like" profile, as best appears in FIG. 17. Bridge anchors 110 are short narrow metal strips which are punched out of skin 27' and displaced upwardly therefrom by a thickness or more of the skin, this being accomplished in any well known manner as by use of a suitable die set punch.

A surface thus formed with bridge anchors 110 may be used to advantage as an under surface to anchor a surface layer thereto to thus provide a composite surface therewith. For example, a concrete slab may be simulated by the panel and its composite surface structure. In such example, mortar is applied to skin 27' of panel 25" and works its way into the openings 111 beneath the bridge anchors 110, and when the mortar sets, the hardened surface layer is firmly anchored to the metal skin 27'.

From the foregoing it should now be apparent that multi-spar panel structures have been disclosed which are well adapted to fulfill the aforestated objects of the invention, and it will be apparent that the same have multi-purpose utility, being well adapted for use as wall, floor, ceiling, roof panels, and other purposes.

While the invention hereinbefore disclosed has been best described with reference to exemplary constructions thereof which give satisfactory results, it will be apparent to those skilled in the art, to which the invention most closely relates or appertains, that the same may be embodied in other forms or carried out in other ways without departing from the spirit or essential characteristics of the invention. The present embodiments of the invention are therefore to be considered as in all respects illustrative and nonrestrictive, the scope of the invention being indicated by the appended claims and all changes that come within the meaning and range of equivalency of the claims are intended to be embraced therein.

Having thus described my invention, what I claim as new and useful and desire to secure by Letters Patent is:

1. Multi-spar panel structure comprising a plurality of elongated panels of modular width coupled together on module from panel to panel, each of said panels comprising a pair of spaced facing sheets, a plurality of spaced thin webs disposed on edge between said facing sheets, a plurality of connecting members each extended the length of said facing sheets and webs, there being a pair of said connecting members for each said web for securing the same to its facing sheets, and means disposed on module and engageable with adjacent connecting members of adjacent panels for coupling the same together, each said panel having outer webs disposed substantially on module and having the connecting members for each of said outer webs extended outwardly therefrom into confronting relation with the corresponding connecting members for the outer web of the adjacent panel whereby adjacently disposed panels are spaced substantially by their mutually confronting connecting members, one pair of said mutually confronting connecting members forming a composite structure bulb-shaped in cross section, and an inverted C-shaped clinch-cap channel member clinched to said composite structure coextensively therewith and staked thereto at spaced intervals along the length thereof, thereby to provide a unitary stress wall construction, said coupling means further comprising a snap-cap releasably engaged with said clinch-cap in a snap-action therewith and extended to opposite sides thereof into overlapping relation to the corresponding facing sheets of said adjacently disposed panels, said confronting connecting members, clinch-cap and snap-cap forming channels therebetween, said channels having a sealant therewithin to seal the composite surface of the coupled panels.

2. Multi-spar panel structure comprising a plurality of elongated panels of modular width coupled together on module from panel to panel, each of said panels comprising a pair of spaced facing sheets, a plurality of spaced thin webs disposed on edge between said facing sheets, a plurality of connecting members each extended the length of said facing sheets and webs, there being a pair of said connecting members for each said web for securing the same to its facing sheets, and means disposed on module and engageable with adjacent connecting members of adjacent panels for coupling the same together, outer ones of said webs having at least one pair of aligned openings, an inter panel shear fitting disposed within said openings, said inter panel shear fitting comprising a short length of metal tubing having circumferentially spaced end portions of the sidewall thereof bent outwardly at each end of the tube to form tabs engageable respectively with the confronting faces of said outer webs.

3. Multi-spar panel structure comprising a plurality of elongated panels of modular width coupled together on module from panel to panel, each of said panels comprising a pair of spaced facing sheets, a plurality of spaced thin webs disposed on edge between said facing sheets, a plurality of connecting members each extended the length of said facing sheets and webs, there being a pair of said connecting members for each said web for securing the same to its facing sheets, and means disposed on module and engageable with adjacent connecting members of adjacent panels for coupling the same together, said coupling means comprising an elongated channel member having in cross section opposed yieldable snap lock portions, and said adjacent connecting members comprising terminal snap lock portions interlockable yieldably with said snap lock portions of said channel member, said coupling means further comprising a bridging plate secured to said channel member and extended to opposite sides thereof into overlapping relation to the corresponding facing sheets of said adjacently disposed panels.

4. Multi-spar panel structure comprising a plurality of elongated panels of modular width coupled together on module from panel to panel, each of said panels comprising a pair of spaced facing sheets, a plurality of spaced thin webs disposed on edge between said facing sheets, a plurality of connecting members each extended the length of said facing sheets and webs, there being a pair of said connecting members for each said web for securing the same to its facing sheets, and means disposed on module and engageable with adjacent connecting members of adjacent panels for coupling the same together, said coupling means comprising an elongated channel member having in cross section opposed yieldable snap lock portions, and said adjacent connecting members comprising terminal snap lock portions interlockable yieldably with said snap lock portions of said channel member, each of said pair of adjacent connecting members having a cross-section of Z configuration wherein one of the legs of the Z is secured to the associated web, the other leg of the Z comprises said yieldable snap lock portion of the connecting member, and the edge portion of the associated facing sheet is conformed and secured to the angularly disposed interconnecting portion of the Z.

5. Multi-spar panel structure comprising a plurality of elongated panels of modular width coupled together on module from panel to panel, each of said panels comprising a pair of spaced facing sheets, a plurality of spaced thin webs disposed in mutually parallel spaced relation and on edge between said facing sheets, a plurality of connecting members each extended the length of said facing sheets and webs, there being a pair of said connecting members for each said web for securing the same to its facing sheets, and means disposed on module and engageable with adjacent connecting members of adjacent panels for coupling the same together, one of said panels being a gable overhang panel, the webs of said overhang panel, the webs of its adjacently disposed panel, and the outer web of the panel adjacent said adjacently disposed panel having at least one row of aligned openings, and a metal tube disposed within said openings interfittingly with said webs.

References Cited
UNITED STATES PATENTS

| | | | |
|---|---|---|---|
| 1,014,157 | 1/1912 | Lewen | 52—336 X |
| 2,256,375 | 9/1941 | Bonsall | 52—629 X |
| 2,377,702 | 6/1945 | Lindsay | 52—582 X |
| 2,396,030 | 3/1946 | Terry | 52 |
| 3,228,158 | 1/1966 | Russell | 52—620 X |
| 3,239,986 | 3/1966 | Russell | 52—620 |

FOREIGN PATENTS

| | | |
|---|---|---|
| 583,605 | 1/1925 | France. |
| 530,763 | 7/1931 | Germany. |

HENRY C. SUTHERLAND, *Primary Examiner.*

G. W. HORNADAY, *Assistant Examiner.*

FRANK L. ABBOTT, *Examiner.*